(12) United States Patent
Jeong et al.

(10) Patent No.: US 11,448,472 B2
(45) Date of Patent: Sep. 20, 2022

(54) HEAT TRANSFER FIN AND FIN-TUBE TYPE HEAT EXCHANGER UNIT USING THE SAME

(71) Applicant: KYUNGDONG NAVIEN CO., LTD., Gyeonggi-do (KR)

(72) Inventors: In Chul Jeong, Seoul (KR); Jung Yul Bae, Seoul (KR)

(73) Assignee: KYUNGDONG NAVIEN CO., LTD., Gyeonggi-Do (KR)

( * ) Notice: Subject to any disclaimer, the term of this patent is extended or adjusted under 35 U.S.C. 154(b) by 43 days.

(21) Appl. No.: 16/724,930

(22) Filed: Dec. 23, 2019

(65) Prior Publication Data

US 2020/0208875 A1 Jul. 2, 2020

(30) Foreign Application Priority Data

Dec. 28, 2018 (KR) .......................... 10-2018-0172604

(51) Int. Cl.
*F28F 1/32* (2006.01)
*F28F 3/02* (2006.01)

(52) U.S. Cl.
CPC ............... *F28F 1/325* (2013.01); *F28F 1/32* (2013.01); *F28F 3/02* (2013.01); *F28F 2270/00* (2013.01)

(58) Field of Classification Search
CPC ... F24H 1/40; F24H 8/00; F24H 8/006; F24H 1/26; F24H 1/44; F24H 9/00; F28D 7/16;
(Continued)

(56) References Cited

U.S. PATENT DOCUMENTS 5,890,532 A    4/1999  Kim et al.
5,975,200 A *  11/1999 Kato .................... F28F 1/325
                                                165/181
(Continued)

FOREIGN PATENT DOCUMENTS

AU    2011202483 B2 *  6/2013  ............. F02G 1/043
CN       1172238 A      2/1998
(Continued)

OTHER PUBLICATIONS

Extended Search Report issued by the European Patent Office dated May 15, 2020; Application Serial No. 19219737.4-1008, in the name of Kyungdong Navien Co., Ltd.

*Primary Examiner* — Edelmira Bosques
*Assistant Examiner* — Michael James Giordano
(74) *Attorney, Agent, or Firm* — Johnson & Martin, P.A.; James David Johnson

(57) ABSTRACT

A heat transfer fin includes a fin body having a plate shape, a plurality of through-holes famed through the fin body and spaced apart from each other in a first direction, in which a heat exchange pipe is inserted into the plurality of through-holes and heating water flows along an empty space in the heat exchange pipe, and two outer body portions protruding outward from at least partial areas of opposite ends of the fin body with respect to the first direction. Each of the outer body portions includes a contact portion that makes contact with a heat-insulating pipe with a heat-insulating side plate therebetween and that has a shape corresponding to at least a partial area of an outer surface of the heat-insulating pipe through which the heating water flows and a separated portion spaced apart from the heat-insulating side plate to form a gap.

8 Claims, 7 Drawing Sheets

(58) Field of Classification Search
CPC . F28D 21/0007; F28F 1/24; F28F 1/32; F28F 1/325; F28F 2270/00
See application file for complete search history.

(56) References Cited

U.S. PATENT DOCUMENTS

| | | | |
|---|---|---|---|
| 8,459,335 B2 | 6/2013 | Lin et al. | |
| 9,829,257 B2 * | 11/2017 | Oohigashi | F28F 1/24 |
| 10,094,589 B2 | 10/2018 | Oohigashi et al. | |
| 10,295,222 B2 * | 5/2019 | Ooshita | F28D 9/005 |
| 2007/0204980 A1 * | 9/2007 | Kim | F28F 9/001 165/172 |
| 2010/0116226 A1 * | 5/2010 | Lovascio | F24H 9/1836 122/367.1 |
| 2011/0024089 A1 | 2/2011 | Lin et al. | |
| 2015/0241130 A1 * | 8/2015 | Kim | F24H 8/00 165/140 |
| 2015/0308756 A1 | 10/2015 | Lee | |
| 2017/0138300 A1 * | 5/2017 | Park | F24H 9/2007 |
| 2017/0205113 A1 | 7/2017 | Oohigashi et al. | |
| 2018/0306529 A1 | 10/2018 | Kasamatsu et al. | |

FOREIGN PATENT DOCUMENTS

| | | | | |
|---|---|---|---|---|
| CN | 201000295 Y | | 1/2008 | |
| CN | 104884889 A | | 9/2015 | |
| CN | 106440375 A | * | 2/2017 | |
| CN | 106537059 A | | 3/2017 | |
| CN | 206890865 U | * | 1/2018 | |
| CN | 108692587 A | | 10/2018 | |
| CN | 108692602 A | * | 10/2018 | |
| EP | 2722610 A1 | * | 4/2014 | ......... F28D 21/0007 |
| EP | 2491326 B1 | * | 12/2018 | ............... F24H 8/00 |
| JP | 03282192 A | * | 12/1991 | ............... F28F 1/325 |
| JP | 07043023 A | * | 2/1995 | ................ F28F 1/32 |
| JP | H07-043023 A | | 2/1995 | |
| JP | H08-159561 A | | 6/1996 | |
| JP | 3941035 B2 | * | 7/2007 | |
| JP | 2016023872 A | * | 2/2016 | |
| JP | 2017150749 A | * | 8/2017 | |
| JP | 2018066519 A | * | 4/2018 | |
| JP | 6381905 B2 | * | 8/2018 | |
| KR | 10-1999-0012110 A | | 11/1999 | |
| KR | 100228032 B1 | * | 11/1999 | ......... F28D 21/0007 |
| KR | 200341663 Y1 | * | 2/2004 | |
| KR | 20-0411648 Y1 | | 3/2006 | |
| KR | 100570286 B1 | * | 4/2006 | |
| KR | 20120016927 A | * | 2/2012 | |
| KR | 20180007933 | | 1/2018 | |
| KR | 20180007933 A | * | 1/2018 | |
| KR | 1020180007933 A | | 1/2018 | |
| WO | WO-2014104575 A1 | * | 7/2014 | ............. F24H 8/006 |

* cited by examiner

HEAT TRANSFER FIN AND FIN-TUBE TYPE HEAT EXCHANGER UNIT USING THE SAME

CROSS-REFERENCE TO RELATED APPLICATION

This application claims the benefit of priority to Korean Patent Application No. 10-2018-0172604, filed in the Korean Intellectual Property Office on Dec. 28, 2018, the entire contents of which are incorporated herein by reference.

TECHNICAL FIELD

The present disclosure relates to a heat transfer fin and a fin-tube type heat exchanger unit using the same.

BACKGROUND

A boiler is an apparatus for heating a desired area by heating fluid in a container. Accordingly, to heat up heating water of the boiler, the boiler generally includes a heat source, a burner including the heat source, and a heat exchanger unit for heating the heating water using combustion gas. In a condensing boiler comprehensively using heat of combustion gas, heating water is heated by supplying, to the heating water, sensible heat generated in a burner and supplying, to the heating water, sensible heat of the combustion gas that is generated in the burner and latent heat caused by a phase change of the combustion gas.

To supply the sensible heat and the latent heat to the heating water, a container for storing the heating water is mainly located in a position close to an area where the combustion gas flows and in a position close to a heat source for supplying sensible heat. The heat is indirectly transferred to the heating water through the container to raise the temperature of the heating water to a temperature appropriate for heating, and thereafter the heating water is supplied to an area that has to be heated.

A heat transfer fin included in a fin-tube type heat exchanger unit used for heat transfer is configured to make contact with the inside of a housing, and due to overheating of the contact area, a side plate may be discolored.

Furthermore, a large amount of combustion gas flows along an area of the heat transfer fin that is adjacent to the inside of the housing so that the amount of heat transferred to the inside of the housing is increased, and thus the side plate is overheated.

As the side plate is overheated, radiation loss of the boiler may be increased, and the durability of the side plate may be deteriorated.

SUMMARY

The present disclosure has been made to solve the above-mentioned problems occurring in the prior art while advantages achieved by the prior art are maintained intact.

An aspect of the present disclosure provides a heat transfer fin designed to prevent a side plate from being overheated, and a heat exchanger unit using the heat transfer fin.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a heat transfer fin includes a fin body having a plate shape, a plurality of through-holes famed through the fin body and spaced apart from each other in a first direction, in which a heat exchange pipe is inserted into the plurality of through-holes and heating water flows along an empty space in the heat exchange pipe, and two outer body portions protruding outward from at least partial areas of opposite ends of the fin body with respect to the first direction. Each of the outer body portions includes a contact portion that makes contact with a heat-insulating pipe with a heat-insulating side plate therebetween and that has a shape corresponding to at least a partial area of an outer surface of the heat-insulating pipe through which the heating water flows and a separated portion spaced apart from the heat-insulating side plate to form a gap.

According to another aspect of the present disclosure, a heat transfer fin includes a fin body having a plate shape, a plurality of through-holes formed through the fin body and spaced apart from each other in a first direction, in which a heat exchange pipe is inserted into the plurality of through-holes and heating water flows along an empty space in the heat exchange pipe, and two outer body portions protruding outward from at least partial areas of opposite ends of the fin body with respect to the first direction. Each of the outer body portions includes a plurality of side louvers that are famed through the outer body portion and that extend in the first direction, and distances from the side louvers to a through-hole most adjacent to the side louvers along the first direction are greater than distances from the side louvers to an outside edge of the outer body portion along the first direction.

According to another aspect of the present disclosure, a heat transfer fin includes a fin body having a plate shape, a plurality of through-holes formed through the fin body and spaced apart from each other in a first direction, in which a heat exchange pipe is inserted into the plurality of through-holes and heating water flows along an empty space in the heat exchange pipe, and two outer body portions protruding outward from at least partial areas of opposite ends of the fin body with respect to the first direction. Each of the outer body portions includes a plurality of side louvers that are famed through the outer body portion and that extend in the first direction, and when a flow direction of combustion gas that is to flow along the fin body is referred to as a second direction, at least part of an area of the outer body portion in which the side louvers are formed has a width in the first direction that decreases along the second direction.

According to another aspect of the present disclosure, a heat exchanger unit includes a heat exchanger that receives heat generated by a combustion reaction and heats heating water and that includes a heat exchange pipe having an empty space famed therein in which the heating water flows and a heat transfer fin through which the heat exchange pipe passes, heat-insulating pipes that are disposed adjacent to the heat exchanger with respect to a first direction and that receive the heating water and allow the heating water to flow through the heat-insulating pipes to thermally insulate the heat exchanger, and heat-insulating side plates located between opposite sides of the heat exchanger and the heat-insulating pipes with respect to the first direction. The heat transfer fin includes, on opposite sides thereof with respect to the first direction, contact portions formed to correspond to at least partial areas of outer surfaces of the heat-insulating pipes such that the outer surfaces of the heat-insulating pipes make contact with the contact portions, with the heat-insulating side plates therebetween.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
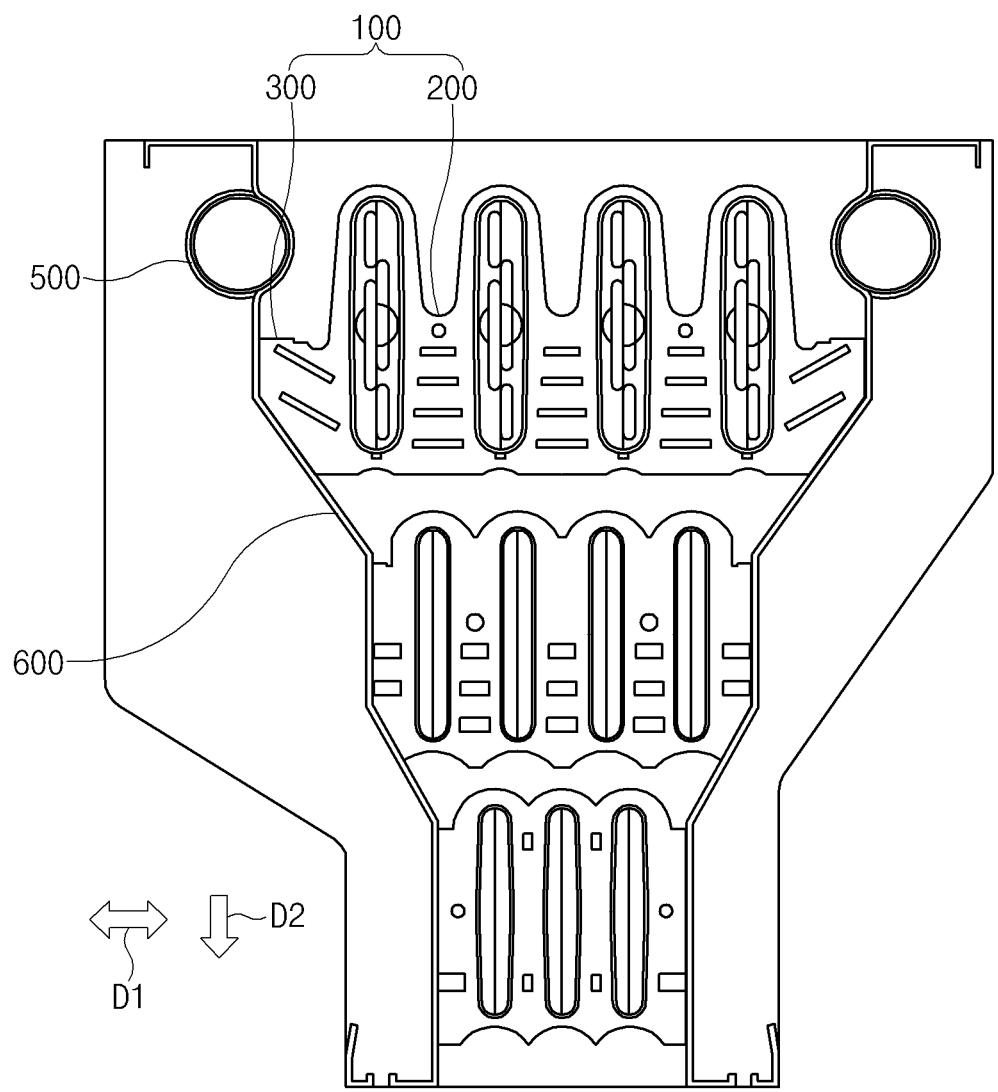
FIG. 1 is a vertical sectional view of an exemplary heat exchanger unit.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, they may mean the components are not only directly "connected", "coupled", or "linked" but also are indirectly "connected", "coupled", or "linked" via a third component.

FIG. 1 is a vertical sectional view of an exemplary heat exchanger unit.

The heat exchanger unit having a heat transfer fin 100 that includes a fin body 200 and outer body portions 300 as illustrated in FIG. 1 may be considered. In the heat exchanger unit, heat-insulating pipes 500 and the heat transfer fin 100 are disposed in interior spaces defined by heat-insulating side plates of a housing 600. The heat-insulating pipes 500 are disposed outward of the heat-insulating side plates, and the heat-insulating pipes 500 and the heat transfer fin 100 are located on opposite sides of the heat-insulating side plates.

A first direction D1 is a direction across a second direction D2 that is a flow direction of combustion gas. Opposite sides of the exemplary heat transfer fin 100 with respect to the first direction D1 may be disposed to make contact with the heat-insulating side plates. However, the outer body portions 300 disposed on the opposite sides of the exemplary heat transfer fin 100 do not make contact with the heat-insulating side plates in areas where the heat-insulating pipes 500 make contact with the heat-insulating side plates.

The exemplary heat transfer fin 100 is heated by sensible heat caused by a flame and sensible heat of the combustion gas. Due to the structure illustrated in FIG. 1, the exemplary heat transfer fin 100 transfers a large amount of heat to portions of the heat-insulating side plates with which the exemplary heat transfer fin 100 makes contact. Accordingly, the heat-insulating side plates, to which a large amount of heat is transferred, are overheated and discolored.

Hereinafter, a heat transfer fin for minimizing discoloration of heat-insulating side plates and a heat exchanger unit including the heat transfer fin will be described with reference to the accompanying drawings.

Figure 2:
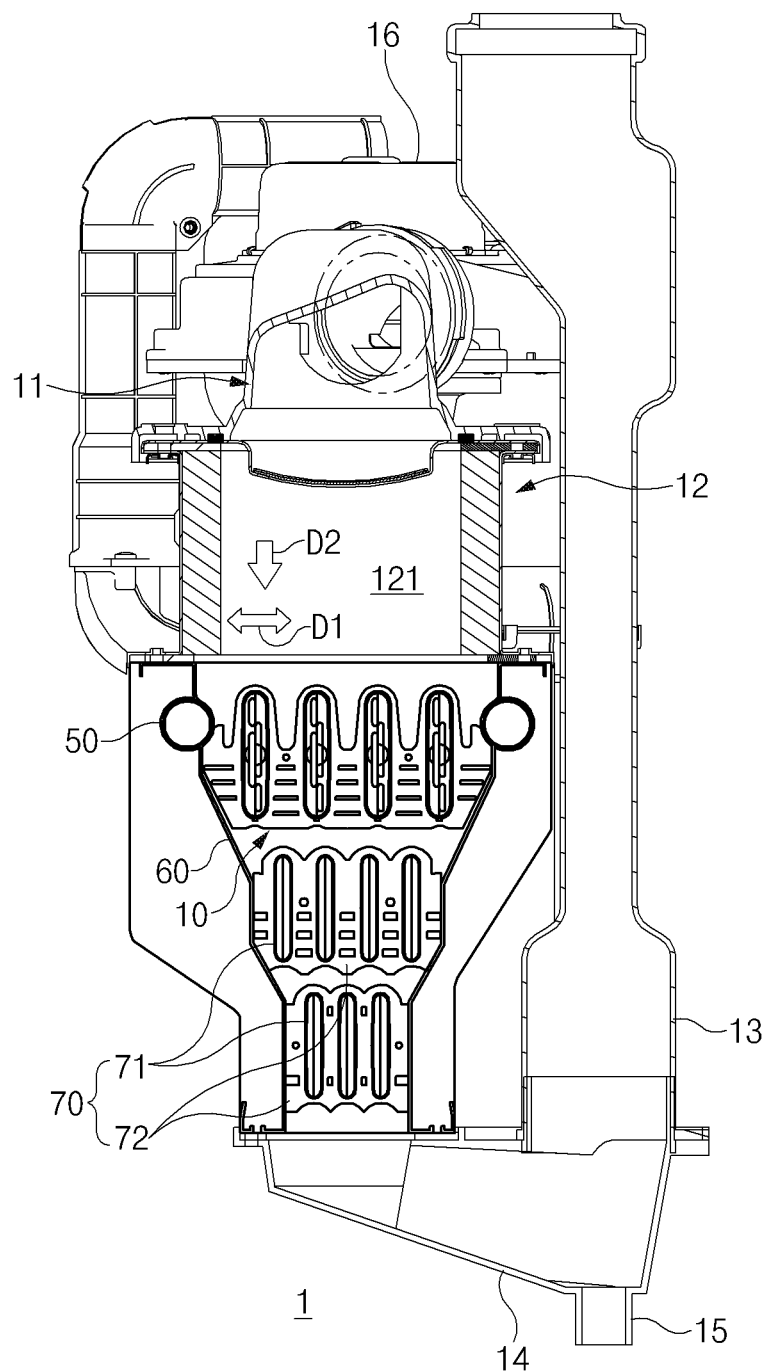
FIG. 2 is a vertical sectional view of a condensing boiler equipped with a heat exchanger unit including a heat transfer fin according to an embodiment of the present disclosure.
Figure 3:
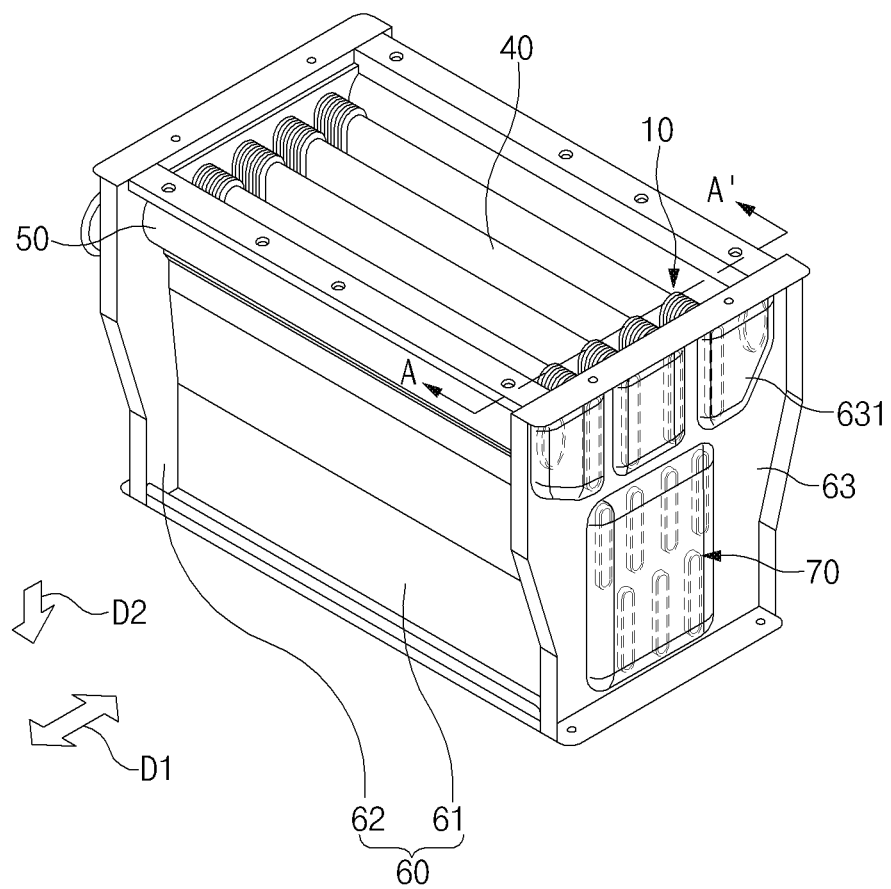
FIG. 3 is a perspective view of the heat exchanger unit including the heat transfer fin according to an embodiment of the present disclosure.
Figure 4:
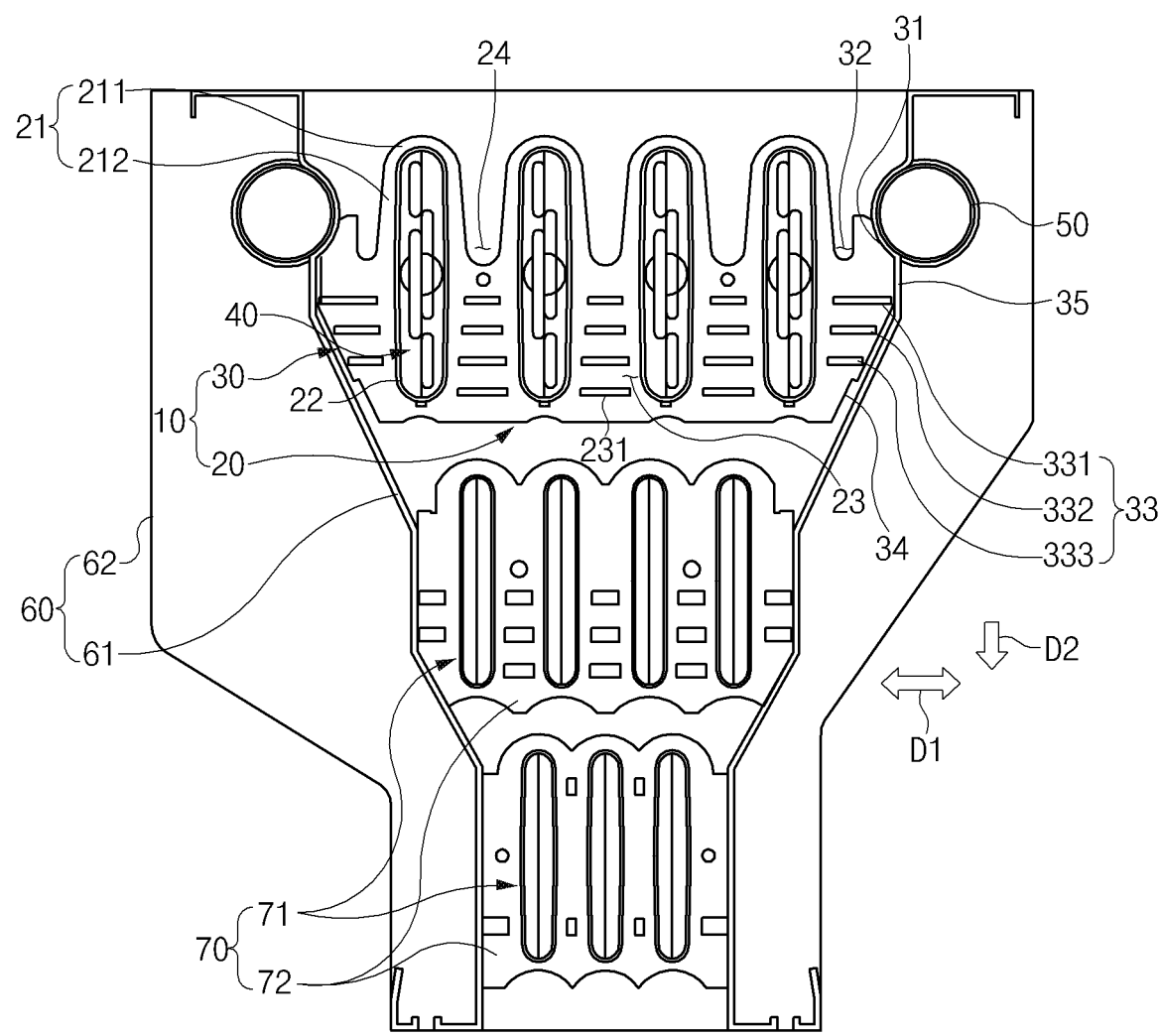
FIG. 4 is a vertical sectional view of the heat exchanger unit including the heat transfer fin according to an embodiment of the present disclosure.

FIG. 2 is a vertical sectional view of a condensing boiler 1 equipped with the heat exchanger unit including the heat transfer fin according to an embodiment of the present disclosure. FIG. 3 is a perspective view of the heat exchanger unit including the heat transfer fin according to an embodiment of the present disclosure. FIG. 4 is a vertical sectional view of the heat exchanger unit including the heat transfer fin according to an embodiment of the present disclosure, where FIG. 4 is a vertical sectional view taken along line A-A' of FIG. 3.

Referring to the drawings, the heat transfer fin according to an embodiment of the present disclosure is applied to a sensible-heat fin 10 and includes a fin body 20, through-holes 22, and outer body portions 30. The heat exchanger unit according to an embodiment of the present disclosure includes a heat exchanger, heat-insulating pipes 50, and heat-insulating side plates 61. The condensing boiler 1 including the heat exchanger unit according to an embodiment of the present disclosure further includes a burner assembly 11 and a combustion chamber 12.

The heat exchanger unit and the condensing boiler 1 using the heat exchanger unit according to an embodiment of the present disclosure will be described based on a top-down condensing boiler 1 in which combustion gas flows vertically downward. Accordingly, the flow direction of the combustion gas that is represented by an arrow may be the same as the vertical downward direction at the position where the condensing boiler 1 is installed. As the top-down condensing boiler 1 is selected, condensate produced by condensation of the combustion gas may be discharged to the outside through a lower end of the condensing boiler 1. However, the configuration of the present disclosure may be used in a bottom-up condensing boiler 1. Furthermore, the heat transfer fin according to an embodiment of the present disclosure may be used in a boiler using only sensible heat rather than the condensing boiler 1.

The condensing boiler 1 according to an embodiment of the present disclosure may include a condensate receiver 14 located at the most downstream side along the flow direction of the combustion gas. When condensate generated from a latent-heat exchanger 70 drops in the vertically downward direction by the weight of the condensate, the condensate receiver 14 may collect the condensate. To allow the collected condensate to be discharged through a condensate outlet 15 extending in the vertically downward direction, the condensate receiver 14 may have an inner surface inclined toward the condensate outlet 15.

Furthermore, to allow residual combustion gas to be discharged at the same time that the condensate is discharged, an exhaust duct 13 may be formed to connect to the condensate receiver 14. The exhaust duct 13 extends in the vertically upward direction and discharges the residual combustion gas to the outside.

In an embodiment of the present disclosure, the second direction D2 may be a direction perpendicular to the first direction D1.

The burner assembly 11 is a component that receives fuel and air and triggers a combustion reaction to generate heat and combustion gas. A flame generated in the burner assembly 11 may be located in an interior space 121 of the combustion chamber 12 connected to the burner assembly 11, and the combustion gas may flow along the interior space 121 of the combustion chamber 12 in the second direction D2. The combustion gas generated in the burner assembly 11 may be forcibly fed in the second direction D2 by a blower 16 that generates wind in one direction.

The heat exchanger unit may be disposed downstream of the combustion chamber 12 with respect to the second direction D2. Accordingly, the heat exchanger unit may receive radiant heat from the flame generated by the burner assembly 11 and may receive heat from the flowing combustion gas.

Heating water is heated in the heat exchanger unit. To heat the heating water, the heat exchanger unit includes heat exchange pipes and the heat transfer fin. The heat exchange pipes and the heat transfer fin may constitute a heat exchanger that receives the heat generated by the combustion reaction and transfers the heat to the heating water. The heat exchanger may include a sensible-heat exchanger that receives sensible heat caused by the flame generated by the burner assembly 11 and sensible heat of the combustion gas and transfers the sensible heat to the heating water, and the latent-heat exchanger 70 that transfers latent heat generated by a phase change of the combustion gas to the heating water. The sensible-heat exchanger may include the sensible-heat fin 10 and a sensible-heat exchange pipe 40 that passes through the sensible-heat fin 10, and the latent-heat exchanger 70 may include a latent-heat fin 72 and a latent-heat exchange pipe 71 that passes through the latent-heat fin 72.

The heat transfer fin according to an embodiment of the present disclosure is the sensible-heat fin 10. Accordingly, the heat transfer fin according to an embodiment of the present disclosure will be described by describing the sensible-heat fin 10. Furthermore, the heat exchange pipe that passes through the through-holes 22 of the heat transfer fin is the sensible-heat exchange pipe 40. However, the heat transfer fin according to an embodiment of the present disclosure may be used as the latent-heat fin 72 in the latent-heat exchanger 70.

The heat exchanger unit according to an embodiment of the present disclosure includes the sensible-heat exchanger and the latent-heat exchanger 70. However, the heat exchanger unit may include only the sensible-heat exchanger.

The latent-heat exchanger 70 may be famed in a fin-tube type. However, the latent-heat exchanger 70 of a plate type may be used. In an embodiment of the present disclosure, the latent-heat exchanger 70 is located downstream of the sensible-heat exchanger with respect to the second direction D2. However, the position of the latent-heat exchanger 70 is not limited thereto.

The latent-heat fin 72 of the latent-heat exchanger 70 may be famed in a plate shape. The latent-heat exchange pipe 71 may include a plurality of straight portions extending in a predetermined direction perpendicular to the first direction D1, and the straight portions may pass through the latent-heat fin 72. While flowing along empty spaces in the straight portions, the heating water is heated by receiving, through the latent-heat fin 72 and the latent-heat exchange pipe 71, latent heat released by condensed combustion gas.

The latent-heat exchanger 70 may be famed on two floors. Here, when the latent-heat exchanger 70 is formed on the two floors, this means that the straight portions of the latent-heat exchange pipe 71 are divided and located at two positions along the second direction D2. As illustrated in the vertical sectional view, one latent-heat fin 72 on each floor, that is, a total of two latent-heat fins 72 are revealed. However, the configuration of the latent-heat exchanger 70 is not limited thereto.

In the cross-section formed by cutting the latent-heat exchange pipe 71 with a plane perpendicular to the extension direction of the latent-heat exchange pipe 71, the interior space of the latent-heat exchange pipe 71 may have the shape of a long narrow hole that extends along the second direction D2. In the cross-section, the interior space of the latent-heat exchange pipe 71 may have a flat shape in which the width in the first reference direction D1 is smaller than the length in the second reference direction D2.

The value obtained by dividing the width by the length is referred to as the aspect ratio of the latent-heat exchange pipe 71. The aspect ratio of the latent-heat exchange pipe 71 may be smaller than the aspect ratio of the sensible-heat exchange pipe 40. Specifically, the aspect ratio of the latent-heat exchange pipe 71 may range from 0.05 to 0.3. The aspect ratio of the sensible-heat exchange pipe 40 may range from 0.15 to 0.5.

In the cross-section, the perimeters of the interior spaces of the heat exchange pipes 40 and 71 are referred to as the internal dimensions of the heat exchange pipes 40 and 71. The internal dimension of the latent-heat exchange pipe 71 may be smaller than the internal dimension of the sensible-heat exchange pipe 40.

The distances from the most upstream sides of the interior spaces of the heat exchange pipes 40 and 71 with respect to the second reference direction D2 to inflection points located at the downstream sides of the interior spaces along the peripheries of the interior spaces are referred to as the effective heat transfer lengths. The value obtained by dividing the effective heat transfer length of the latent-heat exchange pipe 71 by the internal dimension of the latent-heat exchange pipe 71 may be greater than the value obtained by dividing the effective heat transfer length of the sensible-heat exchange pipe 40 by the internal dimension of the sensible-heat exchange pipe 40.

In the cross-section, the perimeters of the heat exchange pipes 40 and 71 are referred to as the external dimensions of the heat exchange pipes 40 and 71. Furthermore, in the cross-section, the lengths of the peripheries of the heat exchange pipes 40 and 71 from the most upstream sides of the heat exchange pipes 40 and 71 with respect to the second reference direction D2 to separation points of the combustion gas for the heat exchange pipes 40 and 71 are referred to as the contact lengths. Here, the separation points are points where the rates of change of speed of the combustion gas on the surfaces of the heat exchange pipes 40 and 71 along the first reference direction D1 are equal to zero, that is, points where the combustion gas is separated from the surfaces of the heat exchange pipes 40 and 71. The value obtained by dividing the contact length of the latent-heat exchange pipe 71 by the external dimension of the latent-heat exchange pipe 71 may be greater than the value obtained by dividing the contact length of the sensible-heat exchange pipe 40 by the external dimension of the sensible-heat exchange pipe 40.

The heat exchange pipes 40 and 71 may have the cross-sectional shapes described above and may thus maximize the contact areas between the heat exchange pipes 40 and 71 and the combustion gas, thereby achieving efficient heat exchange.

The sensible-heat exchanger is disposed downstream of the combustion chamber 12 with respect to the second direction D2 that is the flow direction of the combustion gas. The sensible-heat exchanger receives, by radiant heat and convection of the combustion gas, the sensible heat that the burner assembly 11 located above the sensible-heat exchanger generates by triggering the combustion reaction, and heats the heating water that flows in the sensible-heat exchanger.

The sensible-heat exchanger includes the sensible-heat exchange pipe 40 through which the heating water flows and around which the combustion gas flows. The sensible-heat exchange pipe 40 is located in a housing 60, and the combustion gas flows around the sensible-heat exchange pipe 40 to indirectly exchange heat with the heating water.

The sensible-heat exchange pipe 40 extends along a predetermined direction in the space famed in the housing 60. The predetermined direction is a direction perpendicular to the first direction D1. Furthermore, the predetermined direction may be a direction perpendicular to the second direction D2. The sensible-heat exchange pipe 40 may include a plurality of straight portions spaced apart from each other along the first direction D1.

The plurality of straight portions are arranged, and fluid channel cap plates 63 including a plurality of fluid channel caps 631 that connect ends of the straight portions inserted into insertion holes formed in a general side plate 62 of the housing 60 are present, so that the set of straight portions forms one sensible-heat exchange pipe 40. Accordingly, a continuous winding fluid channel of the heating water may be famed by the arrangement of the straight portions included in the sensible-heat exchange pipe 40. A latent-heat fluid channel famed by the latent-heat exchange pipe 71 and a sensible-heat fluid channel formed by the sensible-heat exchange pipe 40 are connected by the fluid channel cap plates 63 to form an entire fluid channel in which the heating water is heated while flowing. The sensible-heat fluid channel and the latent-heat fluid channel may include a serial fluid channel and may include a parallel fluid channel.

The housing 60 may be formed in a rectangular parallelepiped shape in which two general side plate parts are parallel to each other with a spacing gap therebetween in a predetermined direction and two heat-insulating side plate parts are parallel to each other with a spacing gap therebetween in the first direction D1. The general side plate parts and the heat-insulating side plate parts may be the general side plates 62 and the heat-insulating side plates 61 that are separate from each other, and may be partial areas of the integrated housing 60. In this disclosure, it will be exemplified that the general side plate parts and the heat-insulating side plate parts are famed by the general side plates 62 and the heat-insulating side plates 61 that are separate from each other.

The general side plates 62 and the heat-insulating side plates 61 may form the interior space of the housing 60. Here, the heat-insulating side plates 61 are used with the meaning of side plates to which the heat-insulating pipes 50 are disposed to be adjacent, rather than the meaning of side plates that reduce the amount of heat transferred to the outside, thereby achieving thermal insulation.

The heat-insulating pipes 50 may be disposed adjacent to the sensible-heat exchanger. The heat-insulating pipes 50 are pipe type components that are disposed to thermally insulate the sensible-heat exchanger by allowing the heating water to flow through the components. Here, the thermal insulation includes both confining heat in any position so as to prevent heat transfer and absorbing heat released from any position to the outside so as to decrease the amount of heat finally released to the outside.

Specifically, the heat-insulating pipes 50 may be disposed adjacent to the outsides of the heat-insulating side plates 61. The heat-insulating pipes 50 may be disposed adjacent to the two heat-insulating side plates 61, respectively. The heat-insulating pipes 50 may be disposed to make contact with the outsides of the heat-insulating side plates 61, or the heat-insulating pipes 50 may be disposed to be spaced apart from the outsides of the heat-insulating side plates 61.

Referring to the drawings, in the heat exchanger unit according to an embodiment of the present disclosure, the heat-insulating pipes 50 may be disposed such that at least parts of the outsides of the heat-insulating pipes 50 make contact with partial areas of the outsides of the heat-insulating side plates 61. Accordingly, the heat-insulating pipes 50 are located outside the housing 60 through which the combustion gas passes. The heat-insulating pipes 50, together with the sensible-heat exchange pipe 40, may form the sensible-heat fluid channel through which the heating water flows.

The heat-insulating pipes 50 may be disposed adjacent to upstream-side ends of the heat-insulating side plates 61 with respect to the second direction D2. The flame of the combustion chamber 12 may reach downstream of the combustion chamber 12 with respect to the second direction D2, and therefore the upstream side of the sensible-heat exchanger may have a highest temperature while making contact with the combustion chamber 12. Accordingly, the heat-insulating pipes 50 may be disposed adjacent to the upstream side of the sensible-heat exchanger and may thermally insulate the upstream side of the sensible-heat exchanger from which a large amount of heat is released due to a large temperature difference between the interior space of the sensible-heat exchanger and the outside.

The sensible-heat exchanger may further include the sensible-heat fin 10 capable of raising the thermal conductivity of the sensible-heat exchange pipe 40, thereby forming a fin-tube type sensible-heat exchanger. The sensible-heat fin 10 is famed in a plate shape that is perpendicular to the extension direction of the sensible-heat exchange pipe 40, and the sensible-heat exchange pipe 40 passes through the sensible-heat fin 10. A plurality of sensible-heat fins 10 may be arranged to be spaced apart from each other at predetermined intervals along the extension direction of the sensible-heat exchange pipe 40. The sensible-heat exchange pipe 40 and the sensible-heat fin 10 may be famed of a metallic material with high thermal conductivity to increase the surface area of the sensible-heat exchange pipe 40 from which the sensible-heat fin 10 receives sensible heat, thereby transferring a larger amount of sensible heat to the heating water.

In the cross-section formed by cutting the sensible-heat exchange pipe 40 with a plane perpendicular to the extension direction of the sensible-heat exchange pipe 40, the interior space of the sensible-heat exchange pipe 40 may have the shape of a long narrow hole that extends along the second direction D2.

The sensible-heat fin 10 has the through-holes 22 through which the straight portions included in the sensible-heat exchange pipe 40 pass, respectively, and the through-holes 22 may have an area the same as, or slightly smaller than, the area of the straight portions such that the straight portions are firmly inserted into the through-holes 22. The sensible-heat fin 10 may be integrally coupled with the sensible-heat exchange pipe 40 through brazing welding. The through-holes 22 may be famed in the shape of a long narrow hole, similarly to the sensible-heat exchange pipe 40. The through-holes 22 are spaced apart from each other in the first direction D1.

However, the heat-insulating pipes 50 are not coupled with the sensible-heat fin 10. The heat-insulating pipes 50 are not fastened with the sensible-heat fin 10, and the heat-insulating pipes 50 and the sensible-heat fin 10 may be disposed on opposite sides, with the heat-insulating side plates 61 therebetween. The sensible-heat fin 10 and the heat-insulating pipes 50 may make contact with the heat-insulating side plates 61, but do not make direct contact with each other. Because the heat-insulating pipes 50 are disposed for thermal insulation of the sensible-heat exchanger rather than for heat exchange between the combustion gas and the heating water, the sensible-heat fin 10 and the heat-insulating pipes 50 are not directly connected with each other. Accordingly, the sensible-heat fin 10 and the heat-insulating pipes 50 are disposed so as not to cross each other.

Sensible-Heat Fin 10

The sensible-heat fin 10 includes the fin body 20 that is famed in a plate shape and that has the through-holes 22 formed therein and the two outer body portions 30 protruding outward from at least partial areas of opposite ends of the fin body 20 with respect to the first direction D1.

Fin Body 20

The fin body 20 may further include body louvers 231 famed through the fin body 20 along the extension direction of the sensible-heat exchange pipe 40. The body louvers 231 are famed through areas 23 between the through-holes 22 by punching. Each of the body louvers 231 includes a burr raised along the periphery thereof. When the combustion gas flows, the burr blocks the combustion gas to cause the combustion gas to flow around the sensible-heat exchange pipe 40, thereby facilitating heat exchange between the combustion gas and the heating water.

The fin body 20 may further include valleys 24 and peripheral portions 21. The fin body 20 may be basically famed to surround the sensible-heat exchange pipe 40. The fin body 20 may surround areas corresponding to a predetermined width from the peripheries of upstream-side end portions of the sensible-heat exchange pipe 40 with respect to the second direction D2 such that the areas are distinguished from the remaining areas of the sensible-heat exchange pipe 40. These areas are referred to as the peripheral portions 21. The valleys 24 may be formed in the fin body 20 along the second direction D2 so as to be located between upstream-side end portions of the adjacent straight portions included in the sensible-heat exchange pipe 40. Areas of the fin body 20 that are adjacent to the upstream-side end portions of the sensible-heat exchange pipe 40 are referred to as distal peripheral portions 211, and the remaining areas of the peripheral portions 21 other than the distal peripheral portions 211 are referred to as intermediate peripheral portions 212. Unnecessary areas are open by forming the valleys 24, and thus the combustion gas may more freely flow between the fin body 20 and the sensible-heat exchange pipe 40.

Outer Body Portions 30

Two outer body portions 30 may be disposed. In an embodiment of the present disclosure, the outer body portions 30 protrude from the remaining areas other than partial areas located upstream with respect to the second direction D2 among the areas of the opposite ends of the fin body 20 with respect to the first direction D1. However, the positions from which the outer body portions 30 protrude are not limited thereto. The two outer body portions 30 disposed on the opposite ends of the fin body 20 with respect to the first direction D1 may have line symmetry with respect to the center line parallel to the second direction D2.

Fin side recesses 32 may be famed along the second direction D2 at upper ends of the outer body portions 30 that are located at the upstream sides of the outer body portions 30 with respect to the second direction D2 and are horizontal along the first direction D1. Recess end portions located at the downstream sides of the fin side recesses 32 may have a semicircular profile on the plane perpendicular to a reference direction.

The upstream-side end portions of the outer body portions 30 and the fin body 20 may be spaced apart from each other by the fin side recesses 32 famed as illustrated. The intermediate peripheral portions 212 and the upstream-side end portions of the outer body portions 30 may be spaced apart from each other by the fin side recesses 32 famed therebetween. Accordingly, heat that the combustion gas transfers to the outer body portions 30 while passing through the outer body portions 30 is not transferred to the portions surrounding the through-holes 22, and thus the concentration of heat in areas located at the upstream sides of the through-holes 22 may be prevented.

Figure 5:
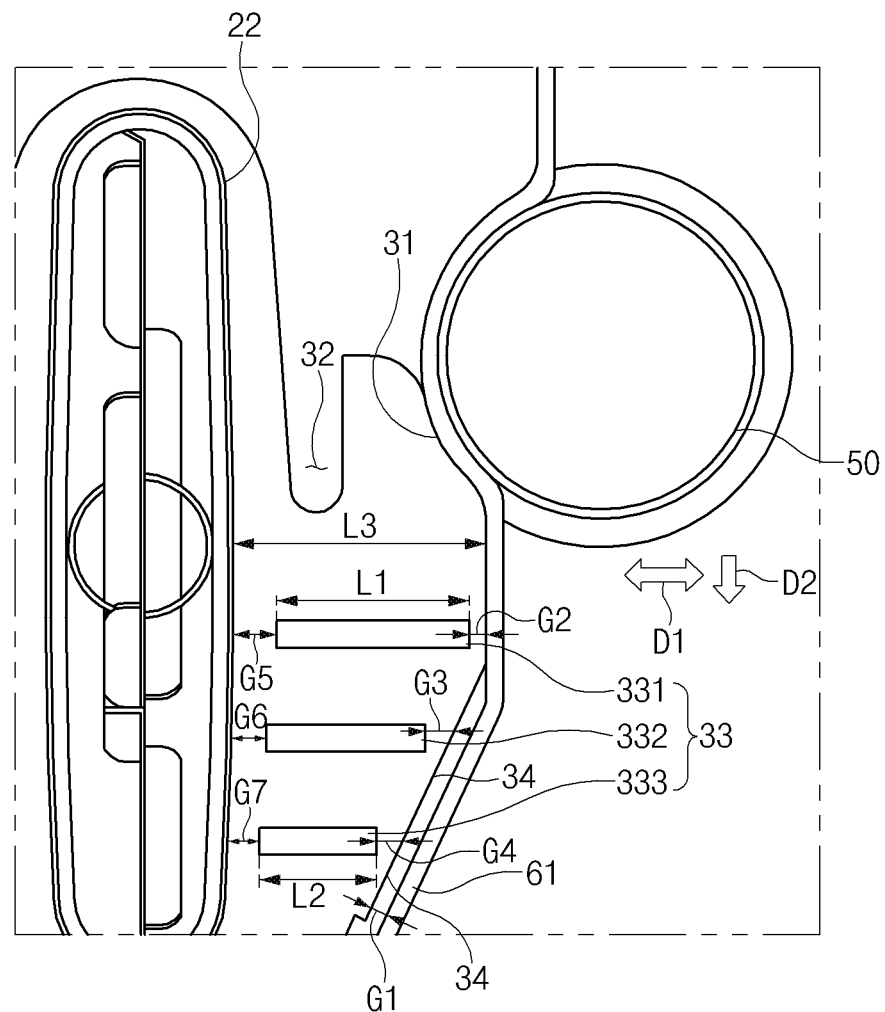
FIG. 5 is an enlarged view of an area adjacent to a heat-insulating pipe of FIG. 3.

FIG. 5 is an enlarged view of an area adjacent to the heat-insulating pipe 50 of FIG. 3.

The outer body portion 30 will be described below with reference to FIGS. 2 to 5. A side louver 33 may be famed in the outer body portion 30. The side louver 33 refers to an opening famed through the outer body portion 30. The side louver 33 may extend along the first direction D1. Similarly to the body louvers 231, the side louver 33 may be famed by punching. The side louver 33 includes a burr raised along the periphery thereof. When the combustion gas flows, the burr blocks the combustion gas to cause the combustion gas to flow around the sensible-heat exchange pipe 40, thereby facilitating heat exchange between the combustion gas and the heating water.

The outer body portion 30 may include a plurality of side louvers 33. The side louvers 33, as illustrated in the drawings, may include a first side louver 331 located at the most upstream side along the second direction D2, a second side louver 332 located adjacent to the first side louver 331 and located downstream of the first side louver 331, and a third side louver 333 located adjacent to the second side louver 332 and located downstream of the second side louver 332. The side louvers 33 may be spaced apart from each other at predetermined intervals along the second direction D2.

The side louvers 33 may be formed such that the distances from the side louvers 33 to the through-hole 22 most adjacent to the side louvers 33 along the first direction D1 decrease along the second direction D2. Referring to the drawings, the distance G6 from an inner end of the second side louver 332 along the first direction D1 to the through-hole 22 most adjacent to the second side louver 332 in the first direction D1 may be smaller than the distance G5 from an inner end of the first side louver 331 to the most adjacent through-hole 22 in the first direction D1. The distance G7 from an inner end of the third side louver 333 to the most adjacent through-hole 22 in the first direction D1 may be smaller than the distance G6 from the inner end of the second side louver 332 to the most adjacent through-hole 22 in the first direction D1. The distances from the inner ends of the side louvers 33 to the adjacent through-hole 22 may be distances measured at the centers of the side louvers 33 along the second direction D2.

As the distances between the side louvers 33 and the through-hole 22 decrease along the second direction D2, when the combustion gas flows along the second direction D2, the amount of combustion gas flowing between the side louvers 33 and the through-hole 22 may be decreased, but the amount of combustion gas flowing between the through-holes 22 adjacent to each other may be increased. Accordingly, the amount of heat transferred from the combustion gas to the outer body portion 30 may be decreased with the decrease in the amount of combustion gas flowing between the side louvers 33 and the through-hole 22.

The distances from the side louvers 33 to the through-hole 22 most adjacent to the side louvers 33 in the first direction D1 may be greater than the distances from the side louvers 33 to the outside edge of the outer body portion 30 in the first direction D1. Referring to the drawings, the distance G5 from the inner end of the first side louver 331 to the most adjacent through-hole 22 along the first direction D1 may be greater than the distance G2 from an outer end of the first side louver 331 to the outside edge of the outer body portion 30. The distance G6 from the inner end of the second side louver 332 to the most adjacent through-hole 22 along the first direction D1 may be greater than the distance G3 from an outer end of the second side louver 332 to the outside edge of the outer body portion 30. The distance G7 from the inner end of the third side louver 333 to the most adjacent through-hole 22 along the first direction D1 may be greater than the distance G4 from an outer end of the third side louver 333 to the outside edge of the outer body portion 30. The distances from the outer ends of the side louvers 33 to the outside edge of the outer body portion 30 may be distances measured at the centers of the side louvers 33 along the second direction D2.

As the distances from the side louvers 33 to the outside edge of the outer body portion 30 are famed as described above, the amount of combustion gas flowing between the through-holes 22 adjacent to each other may be increased, and the amount of combustion gas flowing between the side louvers 33 and the heat-insulating side plate 61 may be decreased. Accordingly, the amount of heat transferred to the heat-insulating side plate 61 may be decreased.

At least part of the area of the outer body portion 30 in which the side louvers 33 are famed may have a width in the first direction D1 that decreases along the second direction D2. Accordingly, as illustrated, the partial area of the outer body portion 30 may have a tapered shape. The width L3 of another partial area of the outer body portion 30 in which the side louvers 33 are not formed may remain constant along the second direction D2. The partial area of the outer body portion 30 in which the side louvers 33 are formed may have a width smaller than the width L3 of the other partial area in the first direction D1, and the width may be gradually decreased along the second direction D2.

Depending on the shape of the partial area of the outer body portion 30, the side louver 33 located at a relatively downstream side with respect to the second direction D2 among the plurality of side louvers 33 may have a smaller width in the first direction D1 than the side louver 33 located at a relatively upstream side. Referring to the drawings, the width of the second side louver 332 may be smaller than the width L1 of the first side louver 331, and the width L2 of the third side louver 333 may be smaller than the width of the second side louver 332. However, even though the width of the outer body portion 30 is not decreased along the second direction D2, the widths of the side louvers 33 may be decreased along the second direction D2.

The partial area of the outer body portion 30 may be brought into contact with the heat-insulating side plate 61, but the other partial area of the outer body portion 30 may be spaced apart from the heat-insulating side plate 61.

Accordingly, the outer body portion 30 may include a contact portion 31 making contact with the heat-insulating side plate 61 and a separated portion 34 spaced apart from the heat-insulating side plate 61.

The outer body portion 30 includes the contact portion 31. The contact portion 31 may be part of the outer body portion 30 that has a shape corresponding to at least a partial area of the outer surface of the heat-insulating pipe 50 so as to make contact with the heat-insulating pipe 50 with the heat-insulating side plate 61 therebetween. The contact portion 31 may be famed on an upper side of the outer body portion 30 with respect to the second direction D2 and may be famed on an outer side of the outer body portion 30 with respect to the first direction D1.

Because the contact portion 31 has a shape corresponding to at least a partial area of the outer surface of the heat-insulating pipe 50, the contact portion 31 may have a circular arc shape when the heat-insulating pipe 50 has a circular cross-section as illustrated.

The heat-insulating side plate 61 is disposed between the contact portion 31 and the heat-insulating pipe 50. Accordingly, the heat-insulating side plate 61 may make contact with the contact portion 31 and the heat-insulating pipe 50. The outer body portion 30 may be heated by the combustion gas and may transfer the heat to the heat-insulating side plate 61 that makes contact with the contact portion 31, and the heat-insulating side plate 61 may transfer the received heat to the heat-insulating pipe 50. The structure may prevent the heat-insulating side plate 61 from being overheated and discolored.

The contact portion 31 may further part making contact with another portion of the heat-insulating side plate 61 that does not make contact with the heat-insulating pipe 50, in addition to the part having a shape corresponding to at least a partial area of the heat-insulating pipe 50. The width L3 of the part of the contact portion 31 in the first direction D1 may remain constant along the second direction D2.

The outer body portion 30 may include the separated portion 34 that is spaced apart from the heat-insulating side plate 61 to form a gap. The separated portion 34 is spaced apart inward from the inside of the heat-insulating side plate 61 along the first direction D1 and does not make contact with the heat-insulating side plate 61.

In an embodiment of the present disclosure, the separated portion 34 may be famed in a shape in which the width in the first direction D1 is decreased along the second direction D2, and the shape of the heat-insulating side plate 61 located at the same position as the separated portion 34 along the second direction D2 may face inside with respect to the first direction D1 along the second direction D2. Accordingly, the separated portion 34 and the heat-insulating side plate 61 may be formed such that the distance G1 by which the separated portion 34 is spaced apart from the heat-insulating side plate 61 in the first direction D1 is maintained to be a predetermined distance along the second direction D2. Because the separated portion 34 has the above-described shape, a partial area of the outer body portion 30 in which the above-described side louvers 33 are famed and that has a decreasing width along the second direction D2 may be the separated portion 34.

Even though the outer body portion 30 is heated, the inside of the heat-insulating side plate 61 that faces the separated portion 34 is not affected by heat of the separated portion 34 that is transferred through conduction because the inside of the heat-insulating side plate 61 does not make contact with the separated portion 34. Accordingly, the outer body portion 30 may make contact with the heat-insulating side plate 61 through only the contact portion 31, and the heat-insulating pipe 50 disposed on the outside of the heat-insulating side plate 61, the inside of which makes contact with the contact portion 31, may cool the heat-insulating side plate 61. Thus, the heat-insulating side plate 61 may be prevented from being overheated and discolored.

Figure 6:
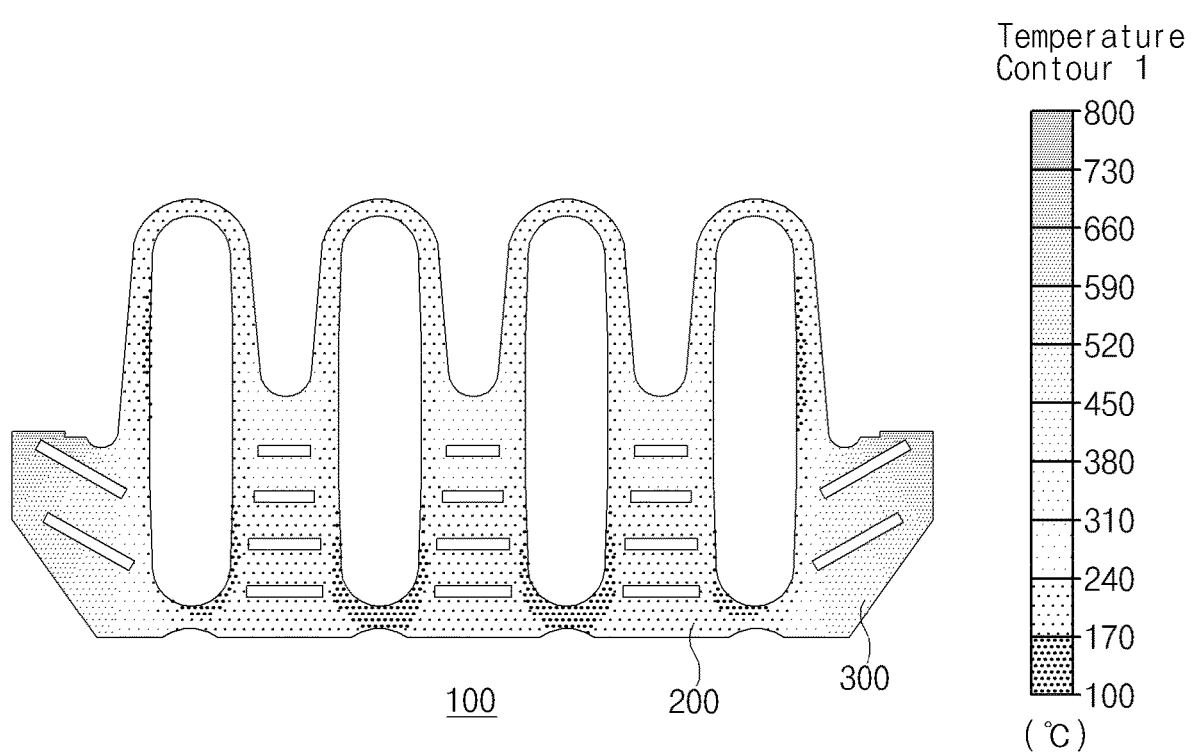
FIG. 6 is a view illustrating a temperature distribution of an exemplary heat transfer fin.

FIG. 6 is a view illustrating a temperature distribution of the exemplary heat transfer fin 100.

The temperature distribution of the exemplary heat transfer fin 100 described above with reference to FIG. 1 will be described. It can be seen that the outer body portions 300 located at the opposite ends of the heat transfer fin 100 in the first direction D1 are overheated to a relatively high temperature because the heat-insulating pipes 500 and the heat transfer fin 100 do not meet each other with the heat-insulating side plates therebetween. In the exemplary temperature distribution of FIG. 6, it can be seen that the temperatures of the opposite ends of the heat transfer fin 100 that make contact with the heat-insulating side plates exceed 500 degrees Celsius.

Figure 7:
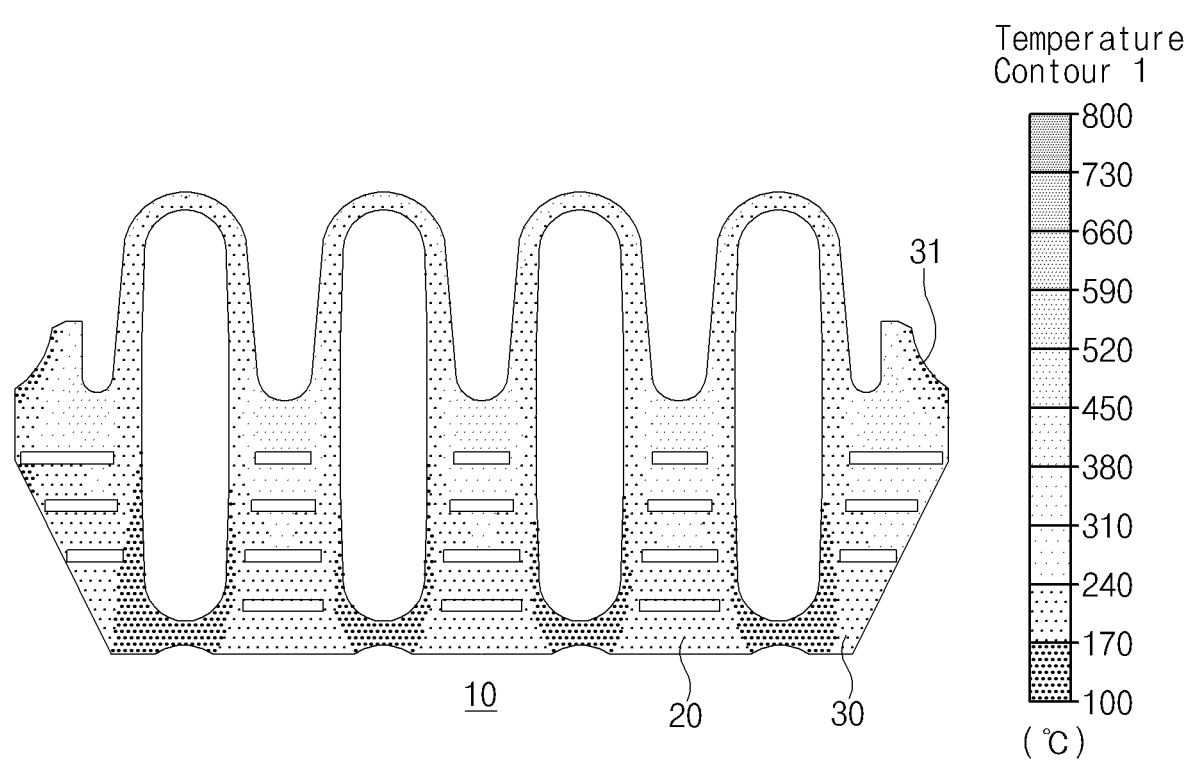
FIG. 7 is a view illustrating a temperature distribution of the heat transfer fin according to an embodiment of the present disclosure.

FIG. 7 is a view illustrating a temperature distribution of the heat transfer fin according to an embodiment of the present disclosure.

Referring to FIG. 7, it can be seen that the temperatures of the contact portions 31 of the outer body portions 30 of the sensible-heat fin 10, which is the heat transfer fin according to an embodiment of the present disclosure, range from 100 degrees Celsius to 240 degrees Celsius. Due to the structure of the contact portions 31 that make contact with the heat-insulating pipes 50 with the heat-insulating side plates 61 therebetween, the structure of the separated portions 34, and the shape of the side louvers 33, the temperatures of the outer body portions 30 may be significantly lower than the temperatures of the outer body portions 300 of the exemplary heat transfer fin 100.

According to the embodiments of the present disclosure, the heat transfer fin and the heat exchanger unit may prevent overheating of partial areas of the heat transfer fin that make contact with the side plates and overheating of the side plates that make contact with the heat transfer fin, thereby preventing discoloration of the side plates.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A heat transfer fin comprising:
   a fin body having a plate shape;
   a plurality of through-holes formed through the fin body and spaced apart from each other in a first direction so as to make a row, wherein a heat exchange pipe is inserted into the plurality of through-holes, and heating water flows along an empty space in the heat exchange pipe; and
   two outer body portions protruding outward from at least partial areas of opposite ends of the fin body with respect to the first direction,
   wherein each of the outer body portions includes:
   a contact portion configured to make contact with a heat-insulating pipe with a heat-insulating side plate therebetween for transferring heat to the heat-insulating pipe through the heat-insulating side plate, the heat-insulating pipe disposed outside of a heat exchanger; and
   a separated portion spaced apart from the heat-insulating side plate to form a gap,
   wherein the contact portion and the heat-insulating pipe are located in a range between two ends of the row of the plurality of through-holes with respect to a second direction which is a flow direction of combustion gas that is to flow along the fin body, and
   wherein a part of the separated portion is located at a downstream side of the contact portion and in the range with respect to the second direction.

2. The heat transfer fin of claim 1, a side louver formed through the outer body portion, the side louver extending in the first direction.

3. The heat transfer fin of claim 2,
   wherein the side louver includes a plurality of side louvers, and
   wherein distances from the plurality of side louvers to a through-hole most adjacent to the plurality of side louvers along the first direction decrease along the second direction.

4. The heat transfer fin of claim 2,
   wherein the side louver includes a plurality of side louvers, and
   wherein a side louver located at a relatively upstream side with respect to the second direction among the plurality of side louvers has a greater width in the first direction than a side louver located at a relatively downstream side.

5. The heat transfer fin of claim 4, wherein at least part of an area of the outer body portion in which the side louver is formed has a width in the first direction that decreases along the second direction.

6. The heat transfer fin of claim 1,
wherein a fin side recess is formed along the second direction at an upper end of the outer body portion that is located at an upstream side of the outer body portion with respect to the second direction.

7. A heat exchanger unit comprising:
a heat exchanger configured to receive heat generated by a combustion reaction and to heat heating water, the heat exchanger including a heat exchange pipe having an empty space formed therein in which the heating water flows and a heat transfer fin through which the heat exchange pipe passes;
heat-insulating pipes disposed outside of the heat exchanger and adjacent to the heat exchanger with respect to a first direction and configured to receive the heating water and allow the heating water to flow through the heat-insulating pipes to thermally insulate the heat exchanger; and
heat-insulating side plates located between opposite sides of the heat exchanger and the heat-insulating pipes with respect to the first direction,
wherein the heat transfer fin includes:
a fin body having a plate shape;
a plurality of through-holes formed through the fin body and spaced apart from each other in the first direction so as to make a row, the heat exchange pipe being inserted into the plurality of through-holes; and
two outer body portions protruding outward from at least partial areas of opposite ends of the fin body with respect to the first direction,
wherein the outer body portions include:
contact portions formed to make contact with the outer surfaces of the heat-insulating pipes make contact with the contact portions, with the heat-insulating side plates therebetween for transferring heat to the heat-insulating pipes through the heat-insulating side plates; and
separated portions that are spaced apart from the heat-insulating side plates to form a gap,
wherein the contact portions and the heat-insulating pipes are located in a range between two ends of the row of the plurality of through-holes with respect to a second direction which is a flow direction of combustion gas that is to flow along the fin body, and
wherein parts of the separated portions are located at a downstream side of the contact portions and in the range with respect to the second direction.

8. The heat exchanger unit of claim 7, wherein widths of the separated portions in the first direction decrease along the second direction, and
wherein distances by which the separated portions are spaced apart from the heat-insulating side plates in the first direction are maintained to be a predetermined distance along the second direction.

\* \* \* \* \*